UNITED STATES PATENT OFFICE.

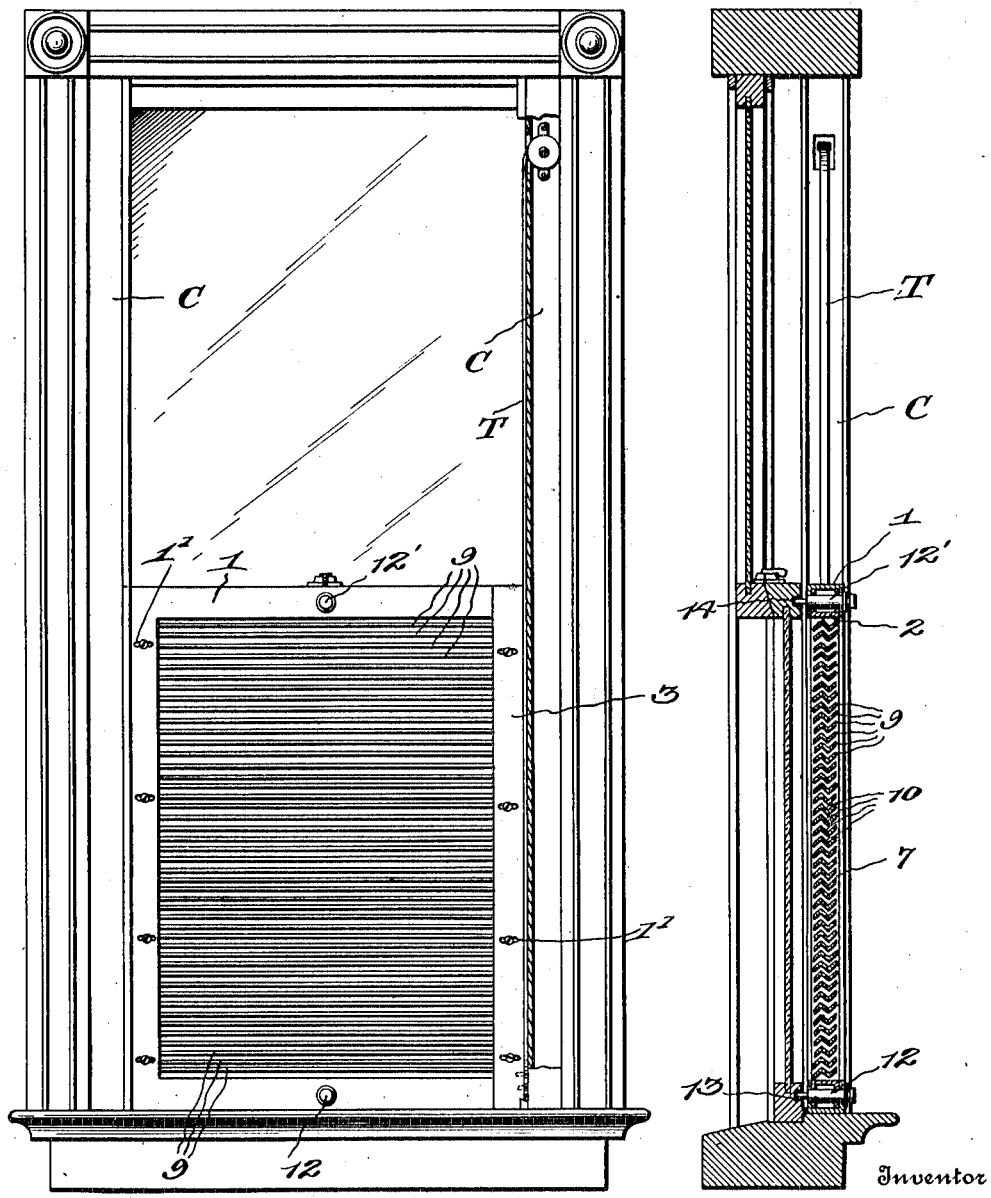

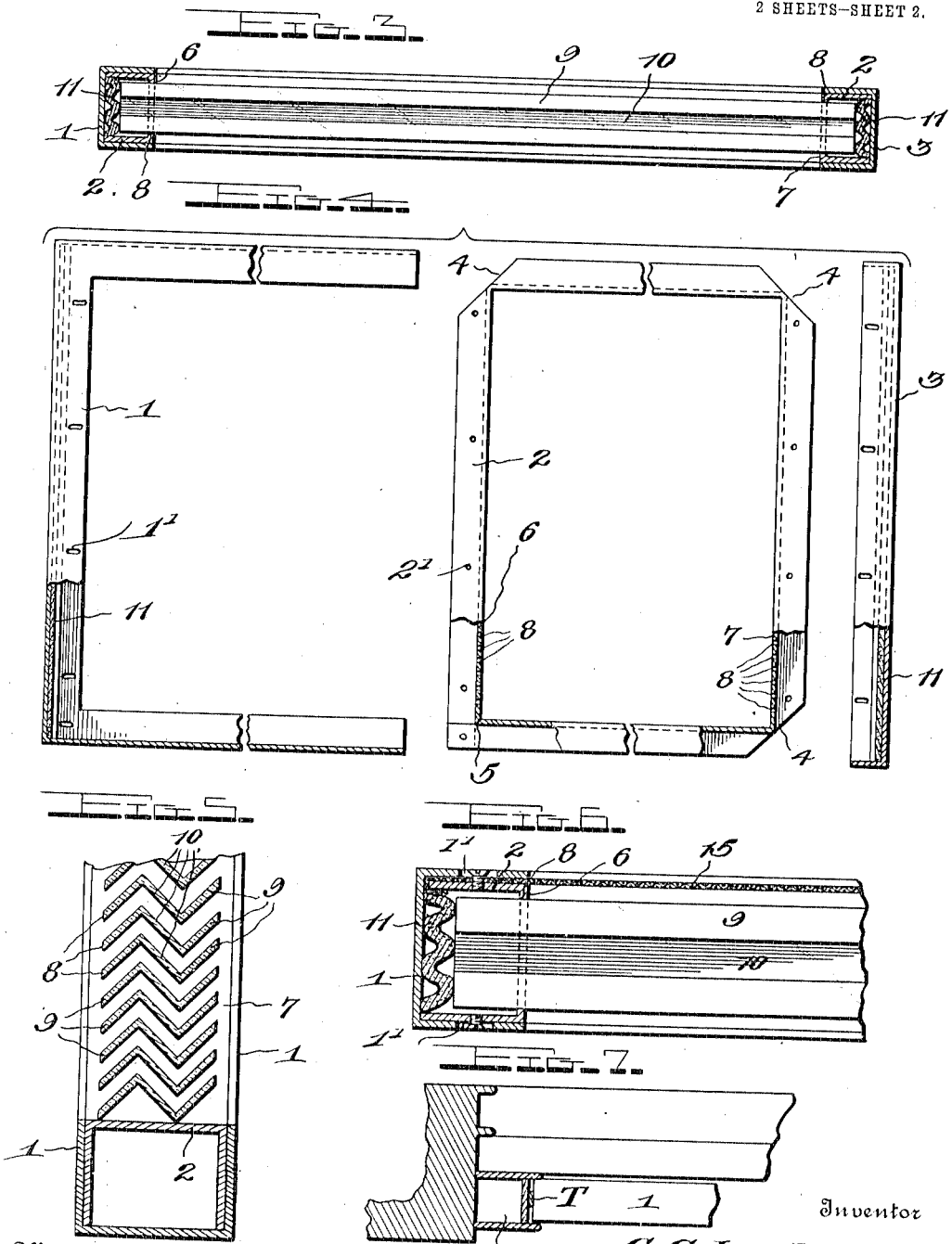

GUSTAV G. LOEHLER, OF WASHINGTON, DISTRICT OF COLUMBIA.

VENTILATOR.

1,118,365.  Specification of Letters Patent.  Patented Nov. 24, 1914.

Application filed October 29, 1913. Serial No. 798,115.

*To all whom it may concern:*

Be it known that I, GUSTAV G. LOEHLER, citizen of the United States, residing at Washington, District of Columbia, have invented certain new and useful Improvements in Ventilators; and I do declare the following to be a full, clear, and exact description of the invention, such as will enable others skilled in the art to which it appertains to make and use the same.

This invention relates to ventilators for windows and other openings such as that shown in my Patent No. 924,479.

The object of the invention is to provide a simple and efficient device of this character which will allow free passage of air to a room or other compartment but will positively preclude entrance of rain and which may be used as a substitute for shutters during a storm avoiding the necessity of closing the windows and thus obviating a source of much discomfort to the occupant, especially if the storm be of long duration.

Another object is to provide a ventilator so constructed as to render it possible for a house holder to air the house at night or during her absence without danger of rain beating in or thieves entering and which excludes flies and other insects.

With these and other objects in view, the invention consists of certain novel features of construction, and the combination and arrangement of parts as will be more fully described and claimed.

In the accompanying drawings: Figure 1 represents a front elevation of a window equipped with this improved ventilator; Fig. 2 represents a longitudinal vertical section thereof; Fig. 3 represents a transverse section of the ventilator; Fig. 4 is a front elevation partly is section, of the sections comprising this ventilator shown separated and arranged in juxtaposition ready for assembling; Fig. 5 is an enlarged detail vertical section through the ventilator; Fig. 6 is an enlarged detail transverse section; Fig. 7 is a detail transverse section through the window frame showing a portion of the ventilator.

This ventilator while it may be associated with any form of compartment or opening is shown applied to a window inside the sash thereof and is mounted to slide in suitable guides here shown in the form of casings C to receive suitable springs and having laterally spaced flanges between which the ventilator operates, tapes T being connected with the ventilator frame and said springs to assist in raising the ventilator when desired.

In the embodiment illustrated this ventilator is shown composed of inner and outer frame sections constructed of sheet metal strips substantially U-shaped in cross section, the outer section being composed of a substantially U-shaped member 1 and a straight side member 3, the inner section 2 being designed to slide within the outer U-shaped member 1 and be secured therein by the detachable side member 3 held in place by screws or other suitable fasteners. The inner section 2 of this frame is preferably composed of a single strip of channeled metal bent as shown in Fig. 4 to form a rectangular frame having three cut off corners 4 and one angular corner 5 where the ends of the strip are connected. The opposite side members 6 and 7 of this frame section 2 are provided with a plurality of longitudinally spaced slots 8 those in one member being arranged opposite those in the other and which are designed to form supports to receive the ends of zigzag slats or vanes 9. These slots 8 are spaced a suitable distances apart to position the vanes 9 a proper distance from each other to permit the free passage of air between them without producing a strong draft or current in the room equipped with this ventilator. These vanes 9 are shown in the form of oppositely disposed triangles having a common leg 10 and they are shown constructed of glass to permit the light to pass therethrough but they may be composed of metal or any other suitable material.

As shown clearly in Figs. 4 and 5 the U-shaped channel members of which the sections are composed are arranged in opposite directions in the two sections, the inner section 2 having the flanges or legs of the channel members extending outwardly and the outer section having side flanges or legs extending inwardly so that when the two sections are assembled the legs of the sides and end members of the inner section fit between and are overlapped by the legs of the channel bars of the outer section forming a casing substantially rectangular in cross section as is shown clearly in Fig. 5. When in this position suitable fastening screws are inserted for connecting the two sections together.

The slots 8 in the opposite side members of the inner section 2 conform in shape to the cross sectional shape of the vanes 9 and the ends of said vanes are adapted to be inserted through said slots and project into the casing formed by the channel bars or strips of the inner and outer sections of the frame and a suitable packing 11 is disposed within said casing between the outer wall thereof and the ends of these vanes 9 to prevent longitudinal movement of the vanes and breakage thereof should they be composed of glass and which prevents rattling when they are composed of metal. This packing 11 is shown corrugated to enhance its packing value, with the corrugations extending in planes at right angles to the planes of the elements constituting the zigzag vanes, whereby the vanes are reliably held against wobbling longitudinally and yet are sufficiently resilient to permit them to move longitudinally under pressure and thus prevent danger of the vanes breaking when made of glass and from bending when made of sheet metal.

This improved ventilator is shown equipped with two locking bolts 12 and 12' arranged in the upper and lower rails or frame members thereof and are here shown extending through the flanges of the inner and outer sections of the ventilator frame, and hence perform the double function of auxiliary connecting elements for the sections and as locking bolts for the ventilator.

The lower sash of the window is shown provided with sockets 13 and 14 in the inner face of its upper and lower rails which are adapted to receive these bolts 12 and 12'. When the upper sash of the window is lowered and the ventilator is raised to close the opening formed by the lowering of this upper sash the lower bolt 12 will engage the socket 13 in the upper rail of the lower sash of the window and securely lock the ventilator in this position. Should the lower sash of the window be raised and the ventilator disposed at the upper portion of the window the bolt 12' will engage the socket 14 in the lower rail of this lower sash and securely lock the sash against being lowered and the ventilator against being raised. When both sashes are closed the bolts 12 and 12' spring into the sockets 13 and 14 but perform no locking function when in this position.

A screen 15 of wire netting or other suitable material is preferably arranged on one face of the ventilator either on the inside or the outside as may be desired and is designed to prevent the entrance of mosquitos or other insects between the vanes 9.

The sections 1 and 2 of these ventilators are made slightly adjustable to fit windows of approximately the same size but varying slightly in width. This adjustability is accomplished by making the apertures in the side members of the outer section 1 in the form of transversely arranged slots 1' through which the screws which enter the apertures 2' in the inner section 2 extend and which permit a slight transverse movement of section 1 relatively to section 2.

I claim as my invention:

1. A ventilator comprising inner and outer frame sections telescopically engaged and each constructed of channel bars substantially U-shaped in cross section, the free edges of the flanges of one section extending toward those of the other section to form when the parts are assembled a hollow frame, the outer section being composed of a U-shaped member and a straight side member, and the inner section being rectangular, the side members of said sections having registering apertures, those in one section being in the form of slots extending transversely of its side members, fastening elements for engaging said registering apertures to adjustably connect said sections, and vanes carried by said inner section.

2. A ventilator comprising a frame having hollow side members each provided in its inner wall with a plurality of longitudinally spaced slots, a plurality of vanes having the ends thereof mounted in said slots, the slots and vanes being zigzag in cross section, and a corrugated resilient packing arranged in said side members between the outer walls thereof and the ends of the vanes, the corrugations of the packing extending in planes at right angles to the planes of the elements of the vanes.

3. A ventilator comprising a frame, of slidably engaged sections each constructed of channel bars substantially U-shaped in cross section, the inner section being rectangular and having the flanges thereof extending outwardly and the outer section being composed of a straight and a U-shaped member detachably connected, with the flanges thereof extending inwardly, the flanges of the two sections telescoping and forming a hollow casing around said frame, vanes slidable in the inner walls of said inner section and extending into said casing, and longitudinally corrugated cushioning means arranged between the ends of said vanes and the opposed walls of said casing.

4. A ventilator comprising a frame composed of two sections U-shaped in cross section and the flanges of one telescopically engaging those of the other, vanes mounted in said frame, and locking bolts extending transversely through the flanges of the two sections and projecting at one end beyond the frame, whereby they perform the double function of securing means for the frame section and locking means for the frame.

In testimony whereof I have hereunto set my hand in presence of two subscribing witnesses.

GUSTAV G. LOEHLER.

Witnesses:
 JAMES E. SCHRIDER,
 L. O. HILTON.